(12) United States Patent
Tang et al.

(10) Patent No.: US 7,892,645 B2
(45) Date of Patent: Feb. 22, 2011

(54) COATING COMPOSITION FOR THERMOPLASTIC RESIN PARTICLES FOR FORMING FOAM CONTAINERS

(75) Inventors: Jiansheng Tang, Mars, PA (US); David Allen Cowan, Cranberry Township, PA (US); Dennis H Piispanen, Beaver, PA (US); Michael T Williams, Beaver Falls, PA (US)

(73) Assignee: NOVA Chemicals Inc., Moon Township, PA (US)

( * ) Notice: Subject to any disclaimer, the term of this patent is extended or adjusted under 35 U.S.C. 154(b) by 0 days.

(21) Appl. No.: 12/859,519

(22) Filed: Aug. 19, 2010

(65) Prior Publication Data

US 2010/0308486 A1    Dec. 9, 2010

Related U.S. Application Data

(60) Continuation of application No. 12/769,716, filed on Apr. 29, 2010, now Pat. No. 7,785,711, which is a division of application No. 11/480,591, filed on Jul. 3, 2006, now Pat. No. 7,736,740, which is a division of application No. 10/769,349, filed on Jan. 31, 2004, now Pat. No. 7,294,655.

(60) Provisional application No. 60/444,897, filed on Feb. 4, 2003.

(51) Int. Cl.
*A23L 3/00* (2006.01)
*C08L 112/08* (2006.01)

(52) U.S. Cl. .......................... 428/403; 428/407; 521/57; 521/53; 521/54; 521/55; 521/76; 521/114; 521/124; 521/125; 521/146

(58) Field of Classification Search .................. 521/57, 521/53, 54, 55, 56, 76, 114, 124, 125, 146; 428/403, 407

See application file for complete search history.

(56) References Cited

U.S. PATENT DOCUMENTS

| 4,036,675 A | 7/1977 | Amberg et al. |
|---|---|---|
| 4,206,249 A | 6/1980 | Suzuki et al. |
| 4,698,367 A | 10/1987 | Ikeda et al. |
| 4,703,065 A | 10/1987 | Sonnenberg |
| 4,720,429 A | 1/1988 | Sonnenberg |
| 4,785,022 A | 11/1988 | Sonnenberg et al. |
| 4,798,749 A | 1/1989 | Arch et al. |
| 4,840,759 A | 6/1989 | Arch et al. |
| 6,277,491 B1 * | 8/2001 | Sakoda et al. ............... 428/407 |
| 6,416,829 B2 | 7/2002 | Breining et al. |

FOREIGN PATENT DOCUMENTS

JP     2002338725 A2    5/2001

* cited by examiner

*Primary Examiner*—Kelechi C Egwim
(74) *Attorney, Agent, or Firm*—Gary F. Matz

(57) ABSTRACT

Expandable or pre-expanded thermoplastic particles, e.g. polystyrene particles, used to form foam containers e.g. cups, bowls, are coated with a coating composition comprising a liquid part consisting of a) liquid polyethylene glycol with an average molecular weight of 200 to 800; and a solid part comprising components selected from the group consisting of b) polyolefin wax, e.g. polyethylene wax, c) a metal salt of higher fatty acids, e.g. zinc stearate or calcium stearate; d) polyethylene glycol with an average molecular weight of 900 to 10,000; and e) a fatty bisamide or fatty amide, e.g. ethylene bis-stearamide; and combinations of b) through e). The coating composition prevents or resists leakage of liquids and foods with oil and/or fatty components and improves the rim strength and ATF properties of foam containers.

9 Claims, No Drawings

US 7,892,645 B2

COATING COMPOSITION FOR THERMOPLASTIC RESIN PARTICLES FOR FORMING FOAM CONTAINERS

This is continuation of application U.S. Ser. No. 12/769,716 filed Apr. 29, 2010, now U.S. Pat. No. 7,785,711, which is a divisional application of application U.S. Ser. No. 11/480,591 filed Jul. 3, 2006, now U.S. Pat. No. 7,736,740; which is a division of application U.S. Ser. No. 10/769,349 filed on Jan. 31, 2004, now U.S. Pat. No. 7,294,655, which application claims the benefit of U.S. Provisional Application No. 60/444,897 filed Feb. 4, 2003.

BACKGROUND OF THE INVENTION

1. Field of the Invention

The present invention relates to thermoplastic resin particles for forming foam containers, such as cups, bowls, etc.; to a molded article, e.g. foam container made from the resin particles; to a coating composition for the thermoplastic resin particles; and to a method for improving the resistance to leakage of a foam container. More particularly, the present invention pertains to a coating composition for expandable or pre-expanded, i.e. "pre-puff", thermoplastic resin particles, e.g. polystyrene, used in molding containers for carrying liquids, e.g. coffee or foods containing oil and/or fat components such as precooked (instant noodles, soups, sauces, fried chicken) fat-containing foods, and the like.

2. Background Art

The manufacture of molded articles, e.g. containers, e.g. cups, bowls, made from expandable thermoplastic particles is well known. The most commonly used thermoplastic particles are expandable polystyrene particles, referred to as "EPS" particles. Typically, polystyrene beads are impregnated with a blowing agent, which boils below the softening point of the polystyrene and causes the impregnated beads to expand when they are heated. When the pre-expanded beads are heated in a mold cavity, they further expand to fill the cavity and fuse together to form a shaped article, e.g. containers, e.g. cups, bowls, etc.

The formation of molded articles from impregnated polystyrene beads is generally done in two steps. First, the impregnated polystyrene beads are pre-expanded to a density of from about 2 to 12 pounds per cubic foot. The pre-expanded beads are typically called "pre-puff". This first step, i.e. the pre-expansion step, is conventionally carried out by heating the impregnated beads using any conventional heating medium such as steam, hot air, hot water, or radiant heat. Second, the pre-expanded beads ("pre-puff") are heated in a closed mold to further expand the pre-expanded beads to form a fused article having the shape of the mold. This latter step is generally referred to as molding.

The expandable polystyrene particles used to make foam containers are generally prepared by an aqueous suspension polymerization process, which results in beads that can be screened to relatively precise bead sizes. Typically, bead diameters are within the range of from about 0.008 to about 0.02 inch. Occasionally, cups are made from particles having bead diameters as much as 0.03 inches.

In spite of careful bead size control, one problem, which continues to plague the container, industry is that after a period of time the EPS containers have a tendency to leak coffee or to leak the oil and/or fat components in food substances carried by the containers. That is, the coffee or the oil and/or fat permeate around the fused polystyrene beads and through the wall of the container. With regard to the oil and/or fat components, a stain generally forms on the outer surface of the container.

Several approaches have evolved over the years directed toward the reduction of leakage in containers for retaining liquids and/or pre-cooked foods.

Amberg et al., U.S. Pat. No. 4,036,675 discloses a container made from foamed polystyrene, which is lined on one or both sides with unoriented polyolefin film, preferably polypropylene. The film is secured to the foamed plastic base material using a vinylic polymer or polyamide resin as a heat-sensitive adhesive. The film is coated with a wet adhesive and dried before laminating the film to the foam material.

Sonnenberg U.S. Pat. Nos. 4,703,065 and 4,720,429 disclose thermoplastic polymer foam cups for retaining coffee that are molded from thermoplastic polymer particles whose surfaces are coated with a fluorosurfactant before molding.

Sonnenberg U.S. Pat. No. 4,785,022 discloses a method for enhancing the coffee retention of molded foam cups. The method involves coating the expandable polystyrene particles with various rubber polymers and copolymers, e.g. polybutene, polyisobutylene, isobutylene-butene copolymer and butene-ethylene copolymer.

Arch, et al. U.S. Pat. No. 4,798,749 and U.S. Pat. No. 4,840,759 overcome the problem of coffee leakage by replacing conventional blowing agents such as butanes, n-pentane, hexanes, and the halogenated hydrocarbons with isopentane in the expandable styrene polymer particles.

Ikeda, et al., U.S. Pat. No. 4,698,367 discloses expandable thermoplastic resin particles composed of a fluorinated vinyl polymer and a hydrophilic vinyl polymer that covers or is included on the surface or in the surface layer of the expandable thermoplastic particle. These resin particles are useful for producing package containers for oily or fatty foods.

Sakoda et al., U.S. Pat. No. 6,277,491 B1 discloses coating the surface of the resin beads or incorporating resin beads with a fluorine-containing block copolymer comprising a fluorine-containing vinyl-type polymer segment derived from a fluorine-containing vinyl-type monomer and a lipophilic vinyl-type polymer segment derived from a lipophilic vinyl-type monomer.

Suzuki et al., U.S. Pat. No. 4,206,249 discloses a process for producing a paper container having high impermeability to liquid which comprises spray coating a polymerizable solution containing a pre-polymer onto a wall surface of a paper container and irradiating the coated wall with ultraviolet light to effect the setting of the pre-polymer on the wall surface of the container. This forms a coating, which is impermeable to liquids, such as water, milk, soft drinks, oils, etc.

Breining, et al., U.S. Pat. No. 6,416,829 B2 discloses a heat insulating paper cup where the body member is coated on its outside surface with a foamed low density polyethylene, and on its inside surface with an unfoamed modified low density polyethylene.

Japan Unexamined Patent Publication JP2002338725A (Kaneka Corporation) discloses the use of a volatile foaming agent containing 30 to 60% by weight based on the foaming agent of isopentane. The expandable polystyrene resin particles are covered with zinc stearate ranging between 0.2 to 0.5 parts by weight based on 100 parts by weight of resin particle. The amount of foaming agent ranges from 0 to 5.5% by weight of the resin particles.

None of the thermoplastic resin particles of the prior art for making foam containers are coated or covered with a liquid polyethylene glycol and then with one or more components selected from the group consisting of polyolefin wax, e.g. polyethylene wax; a metal salt of higher fatty acids, e.g. zinc stearate; polyethylene glycol; and a fatty bisamide or fatty amide, e.g. ethylene bis-stearamide, for reducing or eliminating the penetration of liquid and/or oil and/or fat components of food items such as coffee, noodles, soups, sauces, stews, meats, and the like through the foam containers.

SUMMARY OF THE INVENTION

The invention meets the above need. The invention particularly relates to expandable thermoplastic particles, preferably polystyrene particles, for making molded articles, e.g. foam containers, e.g. bowls, cups, etc., which containers adequately retain oils and flavorings in food items such as instant noodles, etc., and liquids such as hot coffee or hot water added to food items such as instant soups or noodles, stews, meats or the like.

Expandable or pre-expanded (sometimes referred to as "pre-puff") thermoplastic particles are coated or covered with a coating composition. The resultant containers are less pervious to leakage and/or stains caused by liquids and/or oily and fatty foods.

The coating composition essentially comprises two parts, 1) a liquid part and 2) a powder or solid part. The liquid part comprises a) greater than about 0.01% by weight, based on the weight of the particles, of polyethylene glycol having an average molecular weight ranging from about 200 to about 800 (PEG 200-PEG 800), and the solid part comprises components selected from the group consisting of: b) greater than about 0.01% by weight, based on the weight of the particles, of polyolefin wax; c) greater than about 0.01%, based on the weight of the particles, of a metal salt of higher fatty acids; d) greater than about 0.01%, based on the weight of the particles, of polyethylene glycol having an average molecular weight ranging from 900 to about 10,000 (PEG 900-PEG 10,000), and e) greater than about 0.01%, based on the weight of the particles, of a fatty bisamide or fatty amide, e.g. ethylene bis-stearamide, and combinations of b) through e).

For expandable particles, it is preferable to use component a) and one or more of components b) through e). For pre-expanded or "pre-puff" particles, component a) is optional, and one or more of components b) through e) are used.

A preferred embodiment is a coating composition comprising a) about 0.30% by weight of polyethylene glycol having an average molecular weight of 400 (PEG 400 in liquid form); b) about 0.40% by weight of polyolefin wax, preferably polyethylene wax, and c) about 0.105% by weight of a metal salt of higher fatty acid, preferably zinc stearate.

Preferably, expandable thermoplastic particles are first coated with the liquid polyethylene glycol and then coated with the solid components of the coating composition of the invention. The solid components preferably are mixed or blended together and then mixed or blended with the thermoplastic particles. For pre-expanded particles, as stated hereinabove, the use of the liquid polyethylene glycol is optional. The solid components preferably are mixed or blended together and then mixed or blended with the thermoplastic particles.

The invention also relates to a method for improving the resistance to leakage of molded articles, e.g. foam containers, e.g. cups, bowls, etc. made from thermoplastic resin particles. The method involves, preferably for expandable particles, first applying component a) to the particles and then applying one or more of the solid components of the coating composition to the expandable particles. For pre-expanded particles, the method involves, optionally applying component a) to the particles, and applying one or more of the solid components of the coating composition to the pre-expanded particles.

It is therefore an object of the present invention to provide molded articles, e.g. foam containers which exhibit improved resistance to leakage and therefore improved resistance to stain at least on the outer surface of the containers, and which exhibit improved mechanical properties, such as improved rim strength.

It is a further object of the present invention to provide a coating composition for thermoplastic particles used to form foam containers that are suitable for retaining oily or fatty food items, such as noodles, soups, sauces, stews, meats, and the like, or for retaining liquids such as hot coffee or hot water for instant noodles, soups, stews, etc., and which foam container has at least improved ATF properties and/or improved rim strength properties.

A still further object of the present invention is to provide expandable or pre-expanded thermoplastic particles comprising a coating composition, which increases the integrity of foam articles made from the particles.

And yet a still further object of the present invention is to provide a method for improving the resistance to leakage of a foam container by providing a coating composition for coating thermoplastic resin particles used to form the foam container.

These and other object of the present invention will be better appreciated and understood by those skilled in the art from the following description and appended claims.

DETAILED DESCRIPTION OF THE INVENTION

As used herein, the term "coat" means to contact with a coating composition so as to place a substantial portion of the components of the coating composition of the invention on or near the surface or surfaces of the resin particles being contacted.

As used herein, the term "cover" means principally in the form in which the coating composition adheres in layers on the surface of the resin particles.

The coating composition of the invention essentially comprises two parts, 1) a liquid part and 2) a powder or solid part. The liquid part comprises a) greater than about 0.01% by weight, based on the weight of the particles, of polyethylene glycol having an average molecular weight ranging from about 200 to about 800 (PEG 200-PEG 800). Preferably, the weight percent of the liquid polyethylene glycol is 0.01% by weight to about 0.80% by weight, based on the weight of the particles. The solid part of the coating composition of the invention comprises components selected from the group consisting of: b) greater than about 0.01% and, preferably 0.01% to about 1.0% by weight, based on the weight of the particles, of polyolefin wax, preferably polyethylene wax; c) greater than about 0.01%, and preferably 0.01% to about 0.60% by weight, based on the weight of the particles, of a metal salt of higher fatty acid, preferably zinc stearate; d) greater than about 0.01%, and preferably 0.01% to about 0.80% by weight, based on the weight of the particles, of polyethylene glycol having an average molecular weight ranging from 900 to about 10,000 (PEG 900-PEG 10,000), and e) greater than about 0.01%, and preferably 0.01% to 1.0% by weight, based on the weight of the particles, of a fatty amide or fatty bisamide, e.g. ethylene bis-stearamide, and combinations of components b) through e).

For expandable beads, i.e. dense beads, the coating composition preferably comprises component a) and at least one or more of components b) through e) in combination with component a). For example, the combinations may be comprised of components a) and b); or components a) and c); or components a) and d); or components a) and e); or components a), b), and c); or components a), c), and d); or components a), b), and d); or components a), b), and e); or components a), c), and e); or components a), d), and e); or components a), b), c), and d); or components a), b), c), and e); or components a), c), d), and e); or components a), b), d), and e); or components a), b), c), d), and e).

For pre-expanded particles or "pre-puff" particles, the liquid part is not necessary but in some instances may be preferred, for reasons discussed herein below. For the pre-expanded particles, the solid part of the coating composition will comprise at least of one or more of components b) through e), which may be in combinations similar to those listed in the preceding paragraph for expandable particles.

Any of components a) through e) must be present in an amount greater than or equal to 0.01% by weight, if used alone. If component b) is used it should be present in an amount that is at least 0.01% to about 1.0% by weight, based on the weight of the particles. If component d) is used it should be present in an amount that is at least 0.01% to about 0.8% by weight, based on the weight of the particles. If components b) and d) are used, then preferably both components b) and d) would be present to give a combined weight percent of about 0.01 to about 1.8% by weight based on the weight of the particles. This is an example of a desirable total weight percentage for a combination of components b) and d). Desirable total weight percentages for other combinations of components b) through e) will be apparent to those skilled in the art.

The expandable, and therefore, the pre-expanded thermoplastic particles can be made from any suitable thermoplastic homopolymer or copolymer. Particularly suitable for use are homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer with monomers such as divinylbenzene, butadiene, alkyl methacrylates, alkyl acrylates, acrylonitrile, and maleic anhydride, wherein the vinyl aromatic monomer is present in at least 50% by weight of the copolymer. Styrenic polymers are preferred, particularly polystyrene. However, other suitable polymers may be used, such as polyolefin, e.g. polyethylene, polypropylene, and mixtures thereof.

In the embodiments herein, the expandable thermoplastic particles are expandable polystyrene (EPS) particles. These particles can be in the form of beads, granules, or other particles convenient for the expansion and molding operations. Particles polymerized in an aqueous suspension process are essentially spherical and are preferred for molding or forming the foam container of the invention. These particles are typically screened so that their size ranges from about 0.008 to about 0.02 inch, and in some instances ranges from about 0.008 to about 0.03 inch.

The thermoplastic particles are impregnated using any conventional method with a suitable blowing agent. For example, the impregnation can be achieved by adding the blowing agent to the aqueous suspension during the polymerization of the polymer, or alternatively by re-suspending the polymer particles in an aqueous medium and then incorporating the blowing agent as taught in U.S. Pat. No. 2,983,692 to D. Alelio. Any gaseous material or material which will produce gases on heating can be used as the blowing agent.

In the present invention, the blowing agent can be aliphatic hydrocarbons, such as acetone, methyl acetate, butane, n-pentane, cyclopentane, isopentane, isobutene, neopentane, and mixtures thereof. A preferred blowing agent is normal pentane and mixtures of pentanes i.e. normal pentane, isopentane and/or cyclopentane. Other blowing agents that can be used in the invention are halogenated hydrocarbons, e.g. HFC's, CFC's and HCFC'S, and mixtures thereof. For the expandable particles of the invention, any of the preceding blowing agents may also be used in combination with carbon dioxide, air, nitrogen, and water.

The blowing agent level of the polymer particles generally will be less than 10.0 weight percent, preferably, less than 9.0 weight percent, and most preferably will range from between about 3.0 weight percent to about 6.0 weight percent based on the weight of the thermoplastic resin composition.

Alternatively, water can be blended with the aliphatic hydrocarbons blowing agents or water can be used as the sole blowing agent as taught in U.S. Pat. Nos. 6,127,439; 6,160,027; and 6,242,540 assigned to NOVA Chemicals (International) S.A. In these patents, water-retaining agents are used. The weight percentage of water for use as the blowing agent can range from 1 to 20%. U.S. Pat. Nos. 6,127,439, 6,160,027 and 6,242,540 in their entirety are incorporated herein by reference.

The impregnated thermoplastic particles can be foamed cellular polymer particles as taught in Arch et al. U.S. patent application Ser. No. 10/021,716 assigned to NOVA Chemicals Inc. The foamed cellular particles are preferably polystyrene that are pre-expanded to a density of from about 12.5 to about 34.3 pounds per cubic foot, and which contain a volatile blowing agent level that is less than 6.0 wt %, preferably ranging from about 2.0 wt % to about 5.0 wt %, and more preferably ranging from about 2.5 wt % to about 3.5 wt %, based on the weight of the polymer.

The impregnated expandable thermoplastic particles are generally pre-expanded to a density of from about 2 to about 12 pounds per cubic food prior to molding. The pre-expansion step is carried out conventionally by heating the impregnated beads via any conventional heating medium, e.g. steam, hot air, hot water, or radiant heat. One generally accepted method for accomplishing the pre-expansion of impregnated thermoplastic particles is taught in U.S. Pat. No. 3,023,175 to Rodman.

The pre-expanded beads are heated in a closed mold to further expand the pre-expanded particles to form a foam article, i.e. container.

In an embodiment of the invention, expandable, i.e. impregnated thermoplastic particles are covered or coated with component a), the liquid polyethylene glycol, and then covered or coated with the solid components of the coating composition of the invention prior to the particles being subjected to pre-expansion and molding steps. Any conventional method of coating or covering particles may be utilized in the invention.

In a further embodiment of the invention, the expandable particles are pre-expanded and the pre-expanded thermoplastic particles are coated or covered with the liquid polyethylene glycol and then coated or covered with the solid components of the coating composition of the invention prior to the particles being subjected to the molding step.

It is to be understood that in some instances the pre-expanded particles do not need to be coated with the liquid polyethylene glycol in that the pre-expanded particles generally have a rougher surface finish and a greater surface area for the adherence of the solid components of the coating composition compared to expandable particles that generally have a smooth surface finish and less surface area. However, it has been found by the inventors that the liquid polyethylene glycol tends to lessen the static electricity generally associated with pre-puff particles, especially during the conveyance of these particles via air flow from one piece of plant equipment to another piece of plant equipment. Thus, the application of the liquid polyethylene glycol on pre-expanded or pre-puff particles may be desirable in some instances.

The liquid polyethylene glycol and the solid components of the coating composition cover or coat or can be included on the surfaces of the expandable thermoplastic resin particles. As stated herein above, the term "cover" means principally in the form in which the coating composition adheres in layers on the surface of the resin particles. This can be achieved by first contacting the resin particles with the liquid polyethylene glycol and then sufficiently mixing the resin particles with the solid components of the coating composition in a mixer, such as a drum blender, ribbon blender, V blender, Henschel mixer, Ledage mixer, a high intensity mixer, a low intensity blender, and the like.

The solid components of the coating composition preferably are in powder form. However, the powder form may be made into liquid form by dissolving the powder in solvent or dispersing the powder in water.

Preferably, the thermoplastic particles are contacted first with the liquid polyethylene glycol and then contacted with one or more of the solid components of the coating composition of the invention, as discussed herein above. The solid components preferably are mixed or blended together and then blended or mixed with the thermoplastic particles.

The polyolefin wax of component b) is selected from the group consisting of polyethylene wax and polypropylene wax, and preferably is polyethylene wax. The polyolefin wax has an average molecular weight of about 650 to about 30,000; preferably is in powder form; and has a particle size ranging from about 1 to about 140 microns in diameter, preferably, about 6 microns.

The metal salt of higher fatty acids used as component c) in the coating composition is selected from the group consisting of zinc, magnesium, calcium or aluminum salts of stearic, lauric or myristic acid, of which zinc stearate is preferable.

For a preferred embodiment the coating composition of the invention comprises: component a), polyethylene glycol, in an amount of about 0.30% by weight, based on the weight of the particles, and having an average molecular weight of about 400 (PEG 400 in liquid form); component b), polyolefin wax, preferably polyethylene wax, in an amount of about 0.40% by weight, based on the weight of the particles, and having a particle size of about 6 microns and an average molecular weight of 1,000; and component c), a metal salt of higher fatty acids, preferably zinc stearate, in an amount of about 0.105% by weight, based on the weight of the particles.

In applying the coating composition to the particles, as stated herein above, it is preferable to first cover the resin particles with liquid polyethylene glycol, which is believed to modify the surface tension, i.e. make the surface more hydrophilic, and which is an adhering agent for the coating composition, and then to cover the resin particles with the solid components of the coating composition.

Preferably, the liquid polyethylene glycol has an average molecular weight of about 200 to about 800 (PEG 200-PEG 800), and preferably, has an average molecular weight ranging from about 300 to about 600. In general, the number appearing after the designation "PEG" (polyethylene glycol) indicates the average molecular weight, e.g. PEG 200 represents polyethylene glycol with an average molecular weight of about 200, etc.

The amount of liquid polyethylene glycol is greater than 0.01 and preferably is 0.01% to about 0.80% by weight, based on the weight of the particles, and preferably ranges from about 0.05 to about 0.50% by weight, based on the weight of the particles.

The coating composition covers the thermoplastic resin particles preferably in an amount of 0.005 to 2.0% by weight based on the weight of the particles, and more preferably 0.01 to 1.0% by weight, based on the weight of the thermoplastic resin particles. If the coverage of the coating composition is less than 0.005% by weight, the effect of the prevention of leakage of the liquid or fatty/oil components of the container is generally insufficient, and if the coverage exceeds 2.0% by weight, there may be a tendency to increase the amount of lumping in the pre-expansion of the particles or there may be a tendency to retard the fusing together of the thermoplastic particles in the molding process.

A method of the invention relates to the expandable and optionally pre-expanded thermoplastic particles first being coated with the component a), i.e. the liquid polyethylene glycol e.g. PEG 400, component, and then blending the particles with a mixture of the solid coating composition. If the coating composition is applied to expandable thermoplastic particles, these particles are then pre-expanded, and fed to the mold. If the coating composition is applied to pre-expanded thermoplastic particles, these particles are then fed to the mold.

Polyethylene glycols suitable for use in the coating composition of the invention are represented by the following general formula:

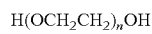

Polyethylene glycols having the above general formula are commercially available from BASF under the trademark PLURACOL®.

Polyethylene waxes suitable for use in the coating composition of the invention are represented by the following general formula:

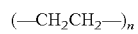

Polyethylene waxes having the above general formula are commercially available from Baker Petrolite under the trademark PETROLITE®. Preferably, polyethylene waxes having an average molecular weight ranging from about 650 to about 30,000 and a particle size ranging between 1 micron and 140 microns are used in the coating composition of the invention.

Zinc stearates suitable for use in the coating composition of the invention are represented by the following general formula:

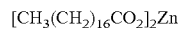

Zinc stearates having the above general formula are commercially available from Ferro under the trademark SYNPRO®.

Ethylene bis-stearamides suitable for use in the coating composition of the invention are represented by the following general formula:

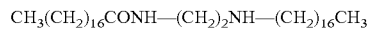

Ethylene bis-stearamide having the above general formula are commercially available from the Crompton Corporation under the trademark KEMAMIDE® W-40.

In addition to substantially coating or covering the thermoplastic resin particles with the coating composition of the invention, an alternate approach is to add the coating composition at the time of impregnating the thermoplastic resin particles with a blowing agent to retain the coating composition in the surface layer of the resin beads.

Preferably, the entire surface of the thermoplastic resin particles is to be coated or covered with a thin film or layer of the coating composition. However, it may be adequate for the purposes of the invention if only a portion of the surfaces of the particles is coated or covered with the coating composition of the invention.

The foam container may be a polystyrene cup that may be fabricated by a conventional cup-forming machine that has an inner shell and an outer shell. An example of this type of machine is MODEL 6-VLC-125 machine made by Autonational B.V. Impregnated thermoplastic particles are either aged or un-aged, are coated with the coating composition, are pre-expanded, and are then fed to a conventional cup-forming machine.

The cup fabrication rate for a single machine (6 molds) producing 10-ounce cups or 16-ounce cups can range from about 30 to 100 cups per minute. Several machines can be used to increase the production rate.

It has been found that the coating composition also tends to improve the rim strength of the container, which in effect, improves the overall strength of the container. The rim strength is a measure of the force required (in kilograms) to cause the rim to crumble a one-fourth inch displacement from the opened edge of the container.

The invention is further illustrated, but not limited by, the following examples.

EXAMPLES

Examples 1-4

For Examples 1-4, expandable polystyrene beads (NOVA Chemical F271TU or F-271T) were first blended with component a) liquid polyethylene glycol 400 (PEG 400) in a drum mixer. These PEG coated beads were then coated with the coating composition comprising the following components: polyethylene glycol 8000 (PEG 8000); and/or polyethylene wax (PE 1000 T6); and/or zinc stearate (ZnS) in the amounts shown in Tables 1-4. The designation PE 1000 T6 for the polyethylene wax indicates that the polyethylene wax has an average molecular weight of about 1000 and a particle size of about 6 microns. This polyethylene wax, PE 1000 T6 is available from the Baker Petrolite Corporation under the trademark PETROLITE®.

Example 1

Five samples (I-V) were prepared by the following procedure:

3.8 pounds of impregnated NOVA Chemicals F271TU (expandable polystyrene) cup beads, ranging from 0.010 to 0.020 inch in diameter and containing 5.6% by weight, based on the weight of the particles, of mixed pentane (n-pentane and isopentane in the ratio of 90:10), and for samples (II-V), liquid PEG 400 in the amounts shown in Table 1 were stir blended in a drum container for 5 minutes. The components of the solid part of the coating composition in the amounts shown in Table 1 were added to the mixture and the contents were further blended for another 5 minutes.

The impregnated, coated beads were pre-expanded in an 11-gallon Rodman Steam pre-expander (Artisan Industries Inc.) at atmospheric pressure. The pre-expansion was operated batch wise with a target pre-puff density of 4.0 pounds per cubic foot (pcf). The newly prepared pre-puff was air dried for 5 minutes to remove the moisture and was allowed to age for about 4 hours before molding.

Ten-ounce cups were molded using the aforesaid Autonational Cup Machine Model 6VLC-125 (standard molding conditions) and using the pre-expanded beads with the densities indicated in Table 1. The steam header pressure was 100 pounds per square inch (psi) and the total cycle time was about 12 seconds. The molded cups were allowed to age overnight before testing.

Four cups for each sample (I-V) were tested by the following method: 1) Since the upper portion of the cup is the most vulnerable area for leakage, testing was done in this area. A circular piece of molded EPS material was placed down into each cup so that the upper 20% to 30% of the cup was made available for testing. 2) 15 grams of oil-fried pasta were crushed and spread evenly on the circular piece of molded EPS material so that the pasta occupied the upper 20 to 30% of the cup. 3) 3 grams of red pepper powder were spread evenly onto the crushed pasta. 4) Each cup was tightly sealed with an adhesive label and plastic stretch film and placed in an oven at a temperature of 149° F. (65° C.) 5) Each sample was checked for stains first every hour during a 7 hour period and then once every 8 hours until failure for a maximum of 3 days.

The average time to failure (ATF) for each cup group sampling was calculated by adding the time to failure for each container and dividing the total time by the number of containers that were tested. The maximum ATF value of 72 hours represents that none of the cups for the cup group sampling exhibited any stain or leakage. The minimum ATF value of 1 hour represents that all of the cups in the cup group sampling failed within the first 1 hour.

Each cup in each cup group sampling (10 cups in each of these group samplings) was tested for rim strength (force applied on the cup rim at ¼ inch displacement) and the average force was recorded.

The results for the stain resistance and rim strength are shown in Table 1.

TABLE 1

| Sample | I (Control) | II | III | IV | V |
|---|---|---|---|---|---|
| PEG 400 (g) | - | 5.17 | 3.50 | 3.50 | 0.90 |
| PE 1000 T6 (g) | - | 6.89 | 9.00 | 12.00 | 18.00 |
| PEG 8000 (g) | - | - | - | - | - |
| ZnS (g) | 1.80 | 1.80 | 1.80 | - | - |
| Density (pcf) | 3.96 | 3.95 | 4.08 | 4.11 | 4.15 |
| Rim Strength (kg) | 0.286 | 0.316 | 0.330 | 0.312 | 0.327 |
| ATF (hour) | 1.5 | 72 | 25 | 37.5 | 14 |

As Table 1 indicates, cups formed with impregnated polystyrene particles that were coated or covered with the coating composition of the invention (Samples II-V) had improved rim strength and improved ATF compared to the control cups (Sample I) that were formed with particles coated only with zinc stearate.

Example 2

The procedure of Example 1 was repeated using the amounts and components shown in Table 2.

TABLE 2

| Sample | I (Control) | VI | VII | VIII |
|---|---|---|---|---|
| PEG 400 (g) | - | 0.60 | 3.50 | 3.45 |
| PE 1000 T6 (g) | - | - | - | - |
| PEG 8000 (g) | - | - | - | 5.17 |
| ZnS (g) | 1.80 | 1.80 | 1.80 | 1.80 |
| Density (pcf) | 3.96 | 3.95 | 4.05 | 3.84 |
| Rim Strength (kg) | 0.286 | 0.298 | 0.323 | 0.307 |
| ATF (hour) | 1.5 | 1.0 | 3 | 27 |

As Table 2 indicates, cups (Samples VI-VIII) formed with impregnated polystyrene particles coated or covered with the coating composition of the invention had improved rim strength and in general improved ATF compared to the control cups (Sample I) that were formed with particles coated solely with zinc stearate.

Example 3

The procedure of Example 1 was repeated except that the expandable polystyrene beads were substituted with beads containing 5.6% by weight, based on the weight of the beads, of normal pentane as the sole blowing agent.

TABLE 3

| Sample | IX (Control) | X | XI | XII | XIII |
|---|---|---|---|---|---|
| PEG 400 (g) | - | 5.17 | 3.50 | 3.50 | 3.45 |
| PE 1000 T6 (g) | - | 6.89 | - | 12.00 | 8.62 |
| PEG 8000 (g) | - | - | - | - | - |
| ZnS (g) | 1.80 | 1.80 | 1.80 | - | 1.80 |
| Density (pcf) | 3.81 | 4.06 | 3.96 | 4.31 | 4.06 |
| Rim Strength (kg) | 0.306 | 0.328 | 0.316 | 0.328 | 0.336 |
| ATF (hour) | 1.5 | 28 | 2 | 23 | 15 |

As Table 3 indicates, cups formed with polystyrene particles impregnated with 5.6% by weight, based on the weight of the particles, of normal pentane as the sole blowing agent and that were coated or covered with the coating composition of the invention (Samples X through XIII) had improved rim strength and improved ATF compared to the control cups (Sample IX) that were coated solely with zinc stearate.

Example 4

The procedure of Example 3 was repeated except that the expandable polystyrene beads were substituted with beads containing 5.65% by weight, based on the weight of beads, of normal pentane as the sole blowing agent and that were pre-lubricated with 0.0225% by weight silicon oil. The beads were coated or covered with the components in the amounts shown in Table 4.

TABLE 4

| Sample | XIV (Control) | XV |
|---|---|---|
| PEG 400 (g) | - | 5.17 |
| PE 1000 T6 (g) | - | 6.89 |
| PEG 8000 (g) | - | - |
| ZnS (g) | 1.80 | 1.80 |
| Density (pcf) | 3.98 | 4.13 |
| Rim Strength (kg) | 0.309 | 0.330 |
| ATF (hour) | 1.5 | 19 |

As Table 4 indicates, the cups formed with the expandable polystyrene particles having 5.6% by weight, based on the weight of the beads, of normal pentane as the sole blowing agent and that were coated or covered with the coating composition of the invention (Sample XV) had improved ATF and improved rim strength compared to the control cups (Sample XIV) that were formed with beads coated only with zinc stearate.

Example 5

3.8 pounds of impregnated NOVA Chemicals F271TU (expandable polystyrene) cup beads, ranging from 0.010 to 0.020 inch in diameter and containing 5.6% by weight, based on the weight of the beads, of normal pentane and 1.80 grams of zinc stearate were stir blended in a drum container for 5 minutes. The impregnated zinc stearate coated beads were pre-expanded in an 11-gallon Rodman Steam pre-expander (Artisan Industries Inc.) at atmospheric pressure. The pre-expansion was operated batch wise with a target pre-puff density of 4.0 pounds per cubic foot (pcf). The newly prepared pre-puff was air dried for 5 minutes to remove the moisture and was allowed to age for about 4 hours. 0.65 pounds of the pre-puff beads were stir blended with 2.95 grams polyethylene wax (PE 1000 T6) for 5 minutes. The coated pre-puff beads were molded using Autonational Cup Machine Model 6VLC-125 (standard molding conditions). The cup molding, the stain testing, and the rim strength testing were done similar to that for Examples 1-4. The formulations and test results are shown in Table 5.

TABLE 5

| Sample | XVI (Control) | XVII |
|---|---|---|
| Bead Lubrication | | |
| Bead Weight (lb.) | 3.80 | 3.80 |
| Zinc Stearate (g) | 1.80 | 1.80 |
| Pre-Puff Lubrication | | - |
| Pre-Puff Weight (lb) | 0.65 | 0.65 |
| PE 1000 T6 (g) | - | 2.95 |
| Pre-Puff Density (pcf) | 3.88 | 3.88 |
| Rim Strength (kg) | 0.301 | 0.301 |
| ATF (hour) | 1.5 | 39 |

Example 5 shows that cups (Sample XVII) formed with particles that were coated or covered with the coating composition of the invention had improved ATF compared to the control cups (Sample XVI) formed with particles covered or coated only with zinc stearate.

Example 6

Expandable polystyrene beads (NOVA Chemical F271TU) were first blended with liquid polyethylene glycol 400 (PEG 400) in a Ross ribbon mini-blender 42N-1/4S (Charles Ross & Son Company, Hauppauge, N.Y.). These PEG coated beads were then coated with a polyethylene wax in the amounts shown in Table 6 and selected from one of the following types of waxes: 1) PE 1000 T6, which is a polyethylene wax having an average molecular weight of about 1000 and a particle size of about 6 microns; 2) PE 850 T10, which is a polyethylene wax having an average molecular weight of about 850 and a particle size of about 10 microns; 3) PE 655 T10, which is a polyethylene wax having an average molecular weight of about 655 and a particle size of about 10 microns; and 4) PE 500 T60, which is a polyethylene wax having an average molecular weight of about 500 and a particle size of about 60 microns. Zinc stearate (ZnS) was used on all samples in the amounts shown in Table 6. The polyethylene waxes are obtained from the Baker Petrolite Corporation under the trademark PETROLITE®.

Five samples (XVIII-XXII) were prepared by the following procedure:

8 pounds of the impregnated, expandable polystyrene cup beads, ranging from 0.010 to 0.020 inch in diameter and containing 5.6% by weight, based on the weight of the particles, of normal pentane and liquid PEG 400 in the amounts shown in Table 6 were blended in the mini-blender for 10 minutes. The components of the solid part of the coating composition in the amounts shown in Table 6 were added to this mixture and the contents were further blended for another 10 minutes.

The impregnated, coated beads were pre-expanded in an 11-gallon Rodman Steam pre-expander (Artisan Industries Inc.) at atmospheric pressure. The pre-expansion was operated batch wise with a target pre-puff density of 4.0-4.5 pounds per cubic foot (pcf). The newly prepared pre-puff was air dried for 5 minutes to remove the moisture and was allowed to age for about 4 hours before molding.

Sixteen-ounce cups were molded using a Master Cup Machine M10 (Master Machine & Tool Co., Mulberry, Fla.) under standard molding conditions. The pre-expanded beads had the densities indicated in Table 6. The steam header pressure was 100 pounds per square inch (psi) and the total cycle time was about 14.8 seconds. The molded cups were allowed to age overnight before testing.

Four cups for each sample (XVIII-XXII) were tested by the following method: 1) In a method similar to that set forth for Examples 1-4, oil fried pre-shaped Nissin cup noodles, available in the US market, were placed in each cup. 2) 3 grams of red pepper powder were spread evenly onto the noodle surface. 3) Each cup was tightly sealed with an adhesive label and plastic stretch film, and placed in the oven at a temperature of 149° F. (65° C.) 4) Each sample was checked for stains first every hour during a 7 hour period and then once every 8 hours until failure for a total of 72 hours or 3 days.

The average time to failure (ATF) was calculated similar to that set forth in Example 1. The maximum ATF value of 72 hours represents that none of the cups for the cup group sampling exhibited any stain or leakage. The minimum ATF value of 1 hour represents that all of the cups in the cup group sampling failed within the first 1 hour.

The results for the stain resistance, in terms of ATF, are shown in Table 6.

TABLE 6

| Sample | XVIII (Control) | XIX | XX | XXI | XXII |
|---|---|---|---|---|---|
| F271TU (lb) | 8.0 | 8.0 | 8.0 | 8.0 | 8.0 |
| PEG 400 (g) | 10.9 | 10.9 | 10.9 | 10.9 | 10.9 |
| PE 1000 T6 (g) | - | 14.5 | - | - | - |
| PE 850 T10 (g) | - | - | 14.5 | - | - |
| PE 655 T10 (g) | - | - | - | 14.5 | - |
| PE 500 T60 (g) | - | - | - | - | 14.5 |
| ZnS (g) | 3.8 | 3.8 | 3.8 | 3.8 | 3.8 |
| Density (pcf) | 4.07 | 4.39 | 4.36 | 4.50 | 4.36 |
| ATF (hour) | 1.8 | 41 | 23 | 28 | 30 |

As Table 6 indicates, cups formed with impregnated polystyrene particles that were coated or covered with the coating composition of the invention (Samples XIX-XXII) had improved ATF compared to the control cups (Sample XVIII) that were formed with particles coated only with zinc stearate.

Control Sample XVIII of Example 6 is compared to the samples of Examples 7, 8, and 9.

Example 7

The procedure of Example 6 was repeated for Example 7. The beads were coated or covered with the components in the amounts shown in Table 7.

TABLE 7

| Sample | XVIII (Control) | XXIII |
|---|---|---|
| F271TU (lb) | 8.0 | 8.0 |
| PEG 400 (g) | - | 3.63 |
| PEG 8000 (g) | - | 7.26 |
| ZnS (g) | 3.8 | 9.07 |
| Density (pcf) | 4.07 | 4.02 |
| ATF (hour) | 1.8 | 72 |

As Table 7 indicates, the cups formed with the expandable polystyrene particles having 5.6% by weight, based on the weight of the beads, of normal pentane as the sole blowing agent and that were coated with the coating composition of the invention (Sample XXIII) had improved ATF compared to the control cups (Sample XVIII) that were formed with beads coated only with zinc stearate.

Example 8

The procedure of Example 6 was repeated for Example 8 with the components in the amounts shown in Table 8. The coated beads were aged for 48 hours before pre-expansion.

TABLE 8

| Sample | XVIII (Control) | XXIV |
|---|---|---|
| F271TU (lb) | 8.0 | 8.0 |
| PEG 400 (g) | - | 10.9 |
| PE 1000 T60 (g) | - | 14.5 |
| ZnS (g) | 3.8 | 3.8 |
| Density (pcf) | 4.07 | 3.98 |
| ATF (hour) | 1.8 | 48 |

As Table 8 indicates, the cups formed with the expandable polystyrene particles having 5.6% by weight, based on the weight of the beads, of normal pentane as the sole blowing agent that were coated or covered with the coating composition of the invention (Sample XXIV) had improved ATF compared to the control cups (Sample XVIII) that were formed with beads coated solely with zinc stearate.

Example 9

The procedure of Example 7 was repeated. PEG 8000 was substituted with ethylene bis-stearamide powder (available from the Crompton Corporation under the trade mark KEMAMIDE® W-40). The beads were coated or covered with the components in the amounts shown in Table 9.

TABLE 9

| Sample | XVIII (Control) | XXV |
|---|---|---|
| F271TU (lb) | 8.0 | 8.0 |
| PEG 400 (g) | - | 10.8 |
| KEMAMIDE ® W-40 (g) | - | 14.5 |
| ZnS (g) | 3.8 | 3.8 |
| Density (pcf) | 4.07 | 4.18 |
| ATF (hour) | 1.8 | 26 |

As Table 9 indicates, the cups formed with the expandable polystyrene particles having 5.6% by weight, based on the weight of the beads, of normal pentane as the sole blowing agent, that were coated with the coating composition of the invention (Sample XXV) had improved ATF compared to the control cups (Sample XVIII) that were formed with beads coated solely with zinc stearate.

Example 10

Expandable polystyrene beads (NOVA Chemical F271TU) were first blended with liquid polyethylene glycol 400 (PEG 400) in a drum mixer. These PEG coated beads were then coated with polyethylene wax and zinc stearate (ZnS) in the amounts shown in Table 10. The polyethylene wax had an average molecular weight of about 1000 and a particle size of about 6 microns. (PE 1000 T6 obtained from Baker Petrolite under the trademark Petrolite®.)

Two samples (XXVI-XXVII) were prepared by the following procedure:

3.8 pounds of impregnated NOVA Chemicals F271TU (expandable polystyrene) cup beads, ranging from 0.010 to 0.020 inch in diameter and containing 5.6% by weight, based on the weight of the particles, of normal pentane.

For sample XXVII, liquid PEG 400 in the amount shown in Table 10 was stir blended with the particles in a drum container for 5 minutes. The polyethylene wax (PE 1000 T6) and zinc stearate in the amounts shown in Table 10 were added to this mixture and the contents were further blended for another 5 minutes.

The impregnated, coated beads were pre-expanded in an 11-gallon Rodman Steam pre-expander (Artisan Industries Inc.) at atmospheric pressure. The pre-expansion was operated batch wise with a target pre-puff density of 4.0 pounds per cubic foot (pcf). The newly prepared pre-puff was air dried for 5 minutes to remove the moisture and was allowed to age for about 4 hours before molding.

Ten-ounce cups were molded using Autonational Cup Machine Model 6VLC-125 (standard molding conditions) and using the pre-expanded beads having the densities indicated in Table 10. The steam header pressure was 100 pounds per square inch (psi) and the total cycle time was about 12 seconds. The molded cups were allowed to age overnight before testing.

Ten cups for each sample (XXVI-XXVII) were tested by the following method: Coffee at 170° F. was poured into each cup and the side walls and bottom of each cup containing coffee were observed for coffee stains or leakage every 15 minutes for the first 2 hours, every one hour from 2 to 6 hours, and then every 8 hours until failure or for a maximum of 6 days.

The average time to failure (ATF) was calculated similar to that set forth in Example 1. The maximum ATF value of 144 hours represents that none of the cups for the cup group sampling exhibited any stain or leakage. The minimum ATF value of 0.25 hour represents that all of the cups in the cup group sampling failed within the first 15 minutes.

The results for coffee resistance are shown in Table 10.

TABLE 10

| Sample | XXVI (Control) | XXVII |
|---|---|---|
| F271TU (lb) | 3.8 | 3.8 |
| PEG 400 (g) | - | 5.17 |
| PE 1000 T6 (g) | - | 6.89 |
| ZnS (g) | - | 1.81 |
| Density (pcf) | 3.88 | 3.96 |
| ATF (hour) | 2.9 | 144 |

As Table 10 indicates, cups formed with impregnated polystyrene particles that were coated or covered with the coating composition of the invention (Sample XXVII) had improved ATF compared to the control cups (Sample XXVI) that were formed with particles coated solely with zinc stearate.

The impregnated thermoplastic particles coated or covered with the coating composition of the invention can be used to form foam containers that hold pre-packaged foods, e.g. instant noodles and/or soups, stews, meats, etc. that are sold on the shelves in the grocery store.

While the present invention has been set forth in terms of specific embodiments thereof, it will be understood in view of the instant disclosure that numerous variations upon the invention are now enabled yet reside within the scope of the invention. For example, even though foam containers are specifically described herein, it is to be understood, that the coating composition for thermoplastic resin particles may be used to form other types of molded articles. Accordingly, the invention is to be broadly construed and limited only by the scope and spirit of the claims now appended hereto.

What is claimed is:

1. A method for improving the resistance to leakage of a foam container comprising:
    obtaining expandable polystyrene particles having a diameter from about 0.008 to about 0.03 inches;
    impregnating the expandable polystyrene particles with a blowing agent;
    applying a coating comprising liquid polyethylene glycol to the expandable polystyrene particles;
    applying a solid component comprising a metal salt of higher fatty acids selected from the group consisting of zinc, magnesium, calcium, and aluminum salt of stearic, lauric, and myristic acid to the polystyrene particles;
    pre-expanding the expandable polystyrene particles to a density of from about 2 to about 12 pounds per cubic foot to form pre-expanded particles; and
    heating the pre-expanded particles in a closed mold to further expand and form a foam container.

2. The method according to claim 1, wherein the liquid polyethylene glycol has an average molecular weight ranging from about 200 to about 800.

3. The method according to claim 1, wherein the amount of liquid polyethylene glycol on the polystyrene particles is from about 0.01% to about 0.80% by weight based on the weight of the particles.

4. The method according to claim 1, wherein the amount of the metal salt of higher fatty acid on the polystyrene particles is from about 0.01% to about 0.60% by weight, based on the weight of the particles.

5. The method according to claim 1 wherein the amount of liquid polyethylene glycol on the polystyrene particles is about 0.30% and the amount of the metal salt of higher fatty acid is about 0.105% by weight, based on the weight of the particles.

6. The method according to claim 1 wherein the metal salt of higher fatty acid is zinc stearate.

7. A method for improving the resistance to leakage of a foam container comprising:
    obtaining expandable polystyrene particles having a diameter from about 0.008 to about 0.03 inches;
    impregnating the expandable polystyrene particles with a blowing agent;
    applying a coating comprising liquid polyethylene glycol having an average molecular weight ranging from about 200 to about 800 to the expandable polystyrene particles in an amount of from about 0.01% to about 0.80% by weight based on the weight of the particles;
    applying a solid component comprising a metal salt of higher fatty acids selected from the group consisting of zinc, magnesium, calcium, and aluminum salt of stearic, lauric, and myristic acid to the polystyrene particles in an amount of from about 0.01% to about 0.60% by weight, based on the weight of the particles;

pre-expanding the expandable polystyrene particles to a density of from about 2 to about 12 pounds per cubic foot to form pre-expanded particles; and heating the pre-expanded particles in a closed mold to further expand and form a foam container.

8. The method according to claim 7 wherein the amount of liquid polyethylene glycol on the polystyrene particles is about 0.30% and the amount of the metal salt of higher fatty acid is about 0.105% by weight, based on the weight of the particles.

9. The method according to claim 7 wherein the metal salt of higher fatty acid is zinc stearate.

* * * * *